(12) United States Patent
Song

(10) Patent No.: US 12,136,285 B2
(45) Date of Patent: Nov. 5, 2024

(54) TEXT PROCESSING METHOD AND APPARATUS, AND ELECTRONIC DEVICE AND NON-TRANSITORY COMPUTER-READABLE MEDIUM

(71) Applicant: Beijing Bytedance Network Technology Co., Ltd., Beijing (CN)

(72) Inventor: Yujun Song, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 194 days.

(21) Appl. No.: 17/639,308

(22) PCT Filed: Aug. 14, 2020

(86) PCT No.: PCT/CN2020/109213
§ 371 (c)(1),
(2) Date: Feb. 28, 2022

(87) PCT Pub. No.: WO2021/036823
PCT Pub. Date: Mar. 4, 2021

(65) Prior Publication Data
US 2022/0319347 A1    Oct. 6, 2022

(30) Foreign Application Priority Data
Aug. 30, 2019   (CN) .......................... 201910816906.3

(51) Int. Cl.
*G06V 30/14*     (2022.01)
*G06F 3/01*      (2006.01)
(Continued)

(52) U.S. Cl.
CPC .......... *G06V 30/1456* (2022.01); *G06F 3/017* (2013.01); *G06V 40/28* (2022.01); *G09B 5/065* (2013.01); *G10L 13/08* (2013.01)

(58) Field of Classification Search
CPC .... G06V 30/1456; G06V 40/28; G06F 3/017; G09B 5/06; G09B 5/065; G10L 13/08
See application file for complete search history.

(56) References Cited

U.S. PATENT DOCUMENTS

| | | | |
|---|---|---|---|
| 6,215,901 B1 * | 4/2001 | Schwartz ........... | G06V 30/1423 382/187 |
| 2009/0253107 A1 | 10/2009 | Marggraff | |
| 2015/0193088 A1 * | 7/2015 | Ding .................... | G06F 3/04883 345/175 |

FOREIGN PATENT DOCUMENTS

| CN | 1424665 A | 6/2003 |
|---|---|---|
| CN | 202093528 U | 12/2011 |

(Continued)

OTHER PUBLICATIONS

Notice of Rejection, mailed on Jul. 28, 2022, Chinese Patent Application No. 201910816906.3, international filing date Aug. 30, 2019. 5 pages.

(Continued)

*Primary Examiner* — Timothy A Musselman
(74) *Attorney, Agent, or Firm* — Astute IP Law Group

(57) ABSTRACT

Provided are a text processing method and apparatus, an electronic device and a non-transitory computer-readable medium. The method includes: collecting a to-be-processed text image, and performing gesture recognition on the to-be-processed text image to obtain a to-be-processed text, where the to-be-processed text is a text selected from the to-be-processed text image through a gesture; performing voice broadcasting on the to-be-processed text to prompt a user to perform dictation processing on the to-be-processed text; and collecting a dictation text image, performing recognition on the dictation text image, and determining a dictation check result according to a recognition result and the to-be-processed text.

12 Claims, 2 Drawing Sheets

Collect a to-be-processed text image, and perform gesture recognition on the to-be-processed text image to determine a to-be-processed text, where the to-be-processed text is a text selected from the to-be-processed text image through a gesture — S110

Broadcast the to-be-processed text in the manner of voice broadcasting to prompt the user to perform dictation processing on the to-be-processed text — S120

Collect a dictation text image, perform recognition on the collected dictation text image, and determine a dictation check result according to a recognition result and the to-be-processed text — S130

(51) Int. Cl.
  *G06V 40/20* (2022.01)
  *G09B 5/06* (2006.01)
  *G10L 13/08* (2013.01)

(56) References Cited

FOREIGN PATENT DOCUMENTS

| | | |
|---|---|---|
| CN | 102999296 A | 3/2013 |
| CN | 105074817 A | 11/2015 |
| CN | 105679119 A | 6/2016 |
| CN | 106687908 A | 5/2017 |
| CN | 106695826 A | 5/2017 |
| CN | 108700957 A | 10/2018 |
| CN | 108805119 A | 11/2018 |
| CN | 109300347 A | 2/2019 |
| CN | 109887349 A | 6/2019 |
| CN | 111415537 A | 7/2020 |
| JP | 2017037125 A | 2/2017 |
| TW | 514840 B | 12/2002 |

OTHER PUBLICATIONS

International Search Report issued for PCT/CN2020/109213 on Nov. 12, 2020.
First Search Report issued for Chinese Patent Application 2019108169063.
Second Office Action issued on May 9, 2022 in connection with Chinese Patent Application No. 201910816906.3.
Chinese Supplemental Search Report issued in connection with Chinese Patent Application No. 201910816906.3.

\* cited by examiner

TEXT PROCESSING METHOD AND APPARATUS, AND ELECTRONIC DEVICE AND NON-TRANSITORY COMPUTER-READABLE MEDIUM

CROSS REFERENCE TO RELATED APPLICATIONS

This is a National Stage Application filed under 35 U.S.C. 371 based on International Patent Application No. PCT/CN2020/109213, filed on Aug. 14, 2020, which claims priority to Chinese Patent Application No. 201910816906.3 filed with the China National Intellectual Property Administration (CNIPA) on Aug. 30, 2019, the disclosures of which are incorporated herein by reference in their entireties.

TECHNICAL FIELD

Embodiments of the present disclosure relate to the field of computer technologies, for example, to a text processing method and apparatus, an electronic device and a non-transitory computer-readable medium.

BACKGROUND

To improve a student's ability to recognize words, the dictation manner is generally adopted to help the student reinforce the grasp of the learned new words. For example, the student may write according to new words read by a teacher or a parent.

However, the parent's nonstandard mandarin or other factors will cause errors in reading and thus mislead the student. Moreover, the dictation needs parental cooperation to successfully complete, while most parents do not have so much time to cooperate. In addition, the traditional dictation manner cannot check the student's dictation results, so that the student cannot correct mistakes in time.

SUMMARY

Embodiments of the present disclosure provide a text processing method and apparatus, an electronic device and a non-transitory computer-readable medium to implement dictation operations for students and timely check of dictation results of the students.

An embodiment of the present disclosure provides a text processing method. The text processing method includes the steps described below.

A to-be-processed text image is collected, and gesture recognition is performed on the to-be-processed text image to obtain a to-be-processed text, where the to-be-processed text is a text selected from the to-be-processed text image through a gesture.

Voice broadcasting is performed on the to-be-processed text to prompt a user to perform dictation processing on the to-be-processed text.

A dictation text image is collected, recognition is performed on the dictation text image, and a dictation check result is determined according to a recognition result and the to-be-processed text.

An embodiment of the present disclosure further provides an electronic device. The electronic device includes one or more processing apparatuses and a storage apparatus configured to store one or more programs.

The one or more programs, when executed by the one or more processing apparatuses, cause the one or more processing apparatuses to implement the text processing method of any one of the embodiments of the present disclosure.

An embodiment of the present disclosure further provides a non-transitory computer-readable medium. The non-transitory computer-readable medium is configured to store a computer program which, when executed by a processing apparatus, implements the text processing method of any one of the embodiments of the present disclosure.

BRIEF DESCRIPTION OF DRAWINGS

Other features, objects and advantages of the present disclosure will become more apparent after a detailed description of non-restrictive embodiments with reference to the drawings is read. Same or similar reference numerals in the drawings denote same or similar elements. It should be understood that the drawings are schematic and that the originals and elements are not necessarily drawn to scale.

DETAILED DESCRIPTION

Embodiments of the present disclosure are described in more detail hereinafter with reference to the drawings. The drawings illustrate some embodiments of the present disclosure, but it should be understood that the present disclosure may be implemented in various manners and is not to be limited to the embodiments set forth herein. These embodiments are provided for a more thorough and complete understanding of the present disclosure. It should be understood that the drawings and embodiments of the present disclosure are merely illustrative and are not intended to limit the scope of the present disclosure.

It should be understood that the various steps recited in the method implementations of the present disclosure may be performed in a different order, and/or in parallel. In addition, the method implementations may include additional steps and/or omit execution of illustrated steps. The scope of the present disclosure is not limited in this respect.

As used in the present disclosure, the term "comprise" and variations thereof are intended to be inclusive, that is, "comprises, but is not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms will be given in the description below.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that "one" and "a plurality" mentioned in the present disclosure are illustrative and not limiting, and that those skilled in the art should understand that "one" and "a plurality" should be understood as "one or more" unless clearly expressed in the context.

The names of messages or information exchanged between multiple apparatuses in the embodiments of the present disclosure are only for illustrative purposes and are not intended to limit the scope of such messages or information.

Figure 1:
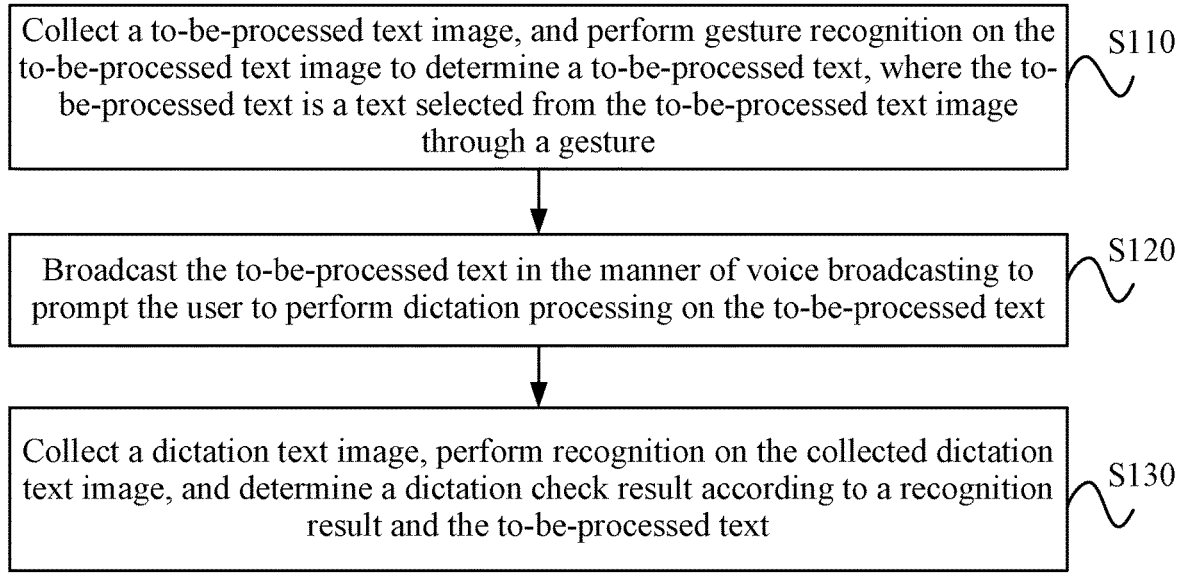
FIG. 1 is a flowchart of a text processing method according to an embodiment of the present disclosure.

FIG. 1 is a flowchart of a text processing method according to an embodiment of the present disclosure. The embodiment of the present disclosure is applicable to the case of assisting students in automatic dictation and automatic checking of new words. The method may be executed by a text processing apparatus. The text processing apparatus may be implemented in software and/or hardware and may be configured in an electronic device having network communication functions. The electronic device may be a mobile phone, a tablet and various learning machine devices. As shown in FIG. 1, the text processing method provided in the embodiment of the present disclosure includes the steps described below.

In step S110, a to-be-processed text image is collected, and gesture recognition is performed on the to-be-processed text image to determine a to-be-processed text, where the to-be-processed text is a text selected from the to-be-processed text image through a gesture.

In the embodiment, different users have different levels of mastery of the same new word, so that different users may use totally different or partially different new words for dictation. In an optional example, when a user needs to perform dictation of new words, the user may independently select new words needing to be dictated through a gesture according to requirements of the user or select new words that have been incorrectly written after dictation according to historical records, that is, the to-be-processed text is selected through a gesture. In another optional example, a teacher or a parent selects a series of to-be-processed texts through gestures according to the past dictation for the student.

In the embodiment, the to-be-processed text image refers to a text selection image in the process of selecting the to-be-processed text by a student, a teacher or a parent through a gesture. When the to-be-processed text is selected through a gesture, a real-time image when the to-be-processed text is selected is collected to obtain the to-be-processed text image. At this time, the to-be-processed text image includes the to-be-processed text selected through the gesture. In an optional example, the electronic device may have a built-in or external image collector. When the to-be-processed text is selected through a gesture, the preset image collector may be used for collecting the real-time image when the user selects the to-be-processed text through a gesture, and using the collected real-time image as the to-be-processed text image. In an embodiment, when the to-be-processed text is selected through a gesture, the collection direction of the built-in or external image collector of the electronic device covers the preset region where a finger of the user is located. In an embodiment, the built-in or external image collector of the electronic device may automatically track the finger of the user to automatically rotate to adjust the image collection direction.

In the embodiment, from the preceding image collection process, it is not difficult to see that the to-be-processed text image includes text selection information when the to-be-processed text is independently selected. For example, the text selection information may refer to the selection information when the to-be-processed text needing to be dictated is selected through a gesture or the selection information when the to-be-processed text needing to be dictated is circled by a gesture. Therefore, after the to-be-processed text image is collected, the electronic device performs gesture recognition on the collected to-be-processed text image, and recognizes the gesture when the to-be-processed text is selected. Further, the to-be-processed text needing to be dictated may be obtained according to the recognized gesture when the to-be-processed text is selected, that is, which new words are selected as the to-be-processed text through the gesture to perform the subsequent dictation operation are determined.

In step S120, the to-be-processed text is broadcasted in the manner of voice broadcasting to prompt the user to perform dictation processing on the to-be-processed text.

In the embodiment, after the to-be-processed text is recognized from the to-be-processed text image, the electronic device may perform voice broadcasting on the to-be-processed text to the user. In this way, the user may perform the dictation operation according to the to-be-processed text broadcasted by voice. In an optional example, after the to-be-processed text is recognized, the electronic device may sequence the obtained one or more to-be-processed texts according to a random or preset sequencing manner, and broadcast the sequenced to-be-processed texts to the user in sequence in the voice broadcasting manner.

In the embodiment, in an optional example, the process of broadcasting the to-be-processed text in the manner of voice broadcasting may include that: the electronic device may import the recognized to-be-processed text into a preset text-to-speech (TTS) engine, and convert the to-be-processed text into an audio file corresponding to the to-be-processed text through the text-to-speech (TTS) engine. Further, the electronic device may play the converted audio file corresponding to the to-be-processed text, to implement the reading of the to-be-processed text to the user in the manner of voice broadcasting.

In step S130, a dictation text image is collected, recognition is performed on the collected dictation text image, and a dictation check result is determined according to a recognition result and the to-be-processed text.

In the embodiment, in the process of reading the to-be-processed text by voice to the user, the user may perform a dictation operation according to the read to-be-processed text. Exemplarily, the user writes text characters on a notebook or other writing media according to the to-be-processed text read by the electronic device. After the user completes the dictation operation for the to-be-processed text read by voice, a dictation check instruction may be sent to the electronic device that broadcasts the to-be-processed text. The electronic device may collect, in response to the dictation check instruction, a real-time image including the to-be-processed text written by the user, that is, collect a dictation text image. Exemplarily, the user may send a voice instruction of "I want to check" to the electronic device, and place the handwritten dictation content within the collection range of the image collector. At this time, the electronic device performs image collection in response to the voice instruction sent by the user to collect the dictation text image.

In the embodiment, the dictation text image includes the handwritten content of the user obtained in the dictation performed according to the to-be-processed text broadcasted by voice. In an optional example, when the electronic device collects the dictation text image of the user, the electronic device may perform character recognition processing on the dictation text image to recognize and obtain the handwritten text content of the user. Further, the electronic device may perform text comparison between the recognized handwritten text content and the to-be-processed text broadcasted by voice, and automatically check the dictation content of the user to determine the dictation check result of the user.

The embodiment of the present disclosure provides a text processing solution. When dictation of new words is required, an electronic device may collect a to-be-processed text image when a user selects a to-be-processed text through a gesture, automatically recognize from the to-be-processed text image the text needing to be dictated which is independently selected by a student, and at the same time, broadcast the to-be-processed text selected by the user in the manner of voice broadcasting for the user to perform the dictation operation. In this way, it is ensured that the dictation of the to-be-processed text needing to be dictated is performed in accordance with standard mandarin during dictation, the dictation operation of the user will not be misled, and the time of the parent will not be occupied. In addition, after the dictation is completed, the automatic dictation check may further be performed on the dictation operation of the student according to the collected dictation text image of the user, so that the dictation result can be fed back to the students in time.

Figure 2:
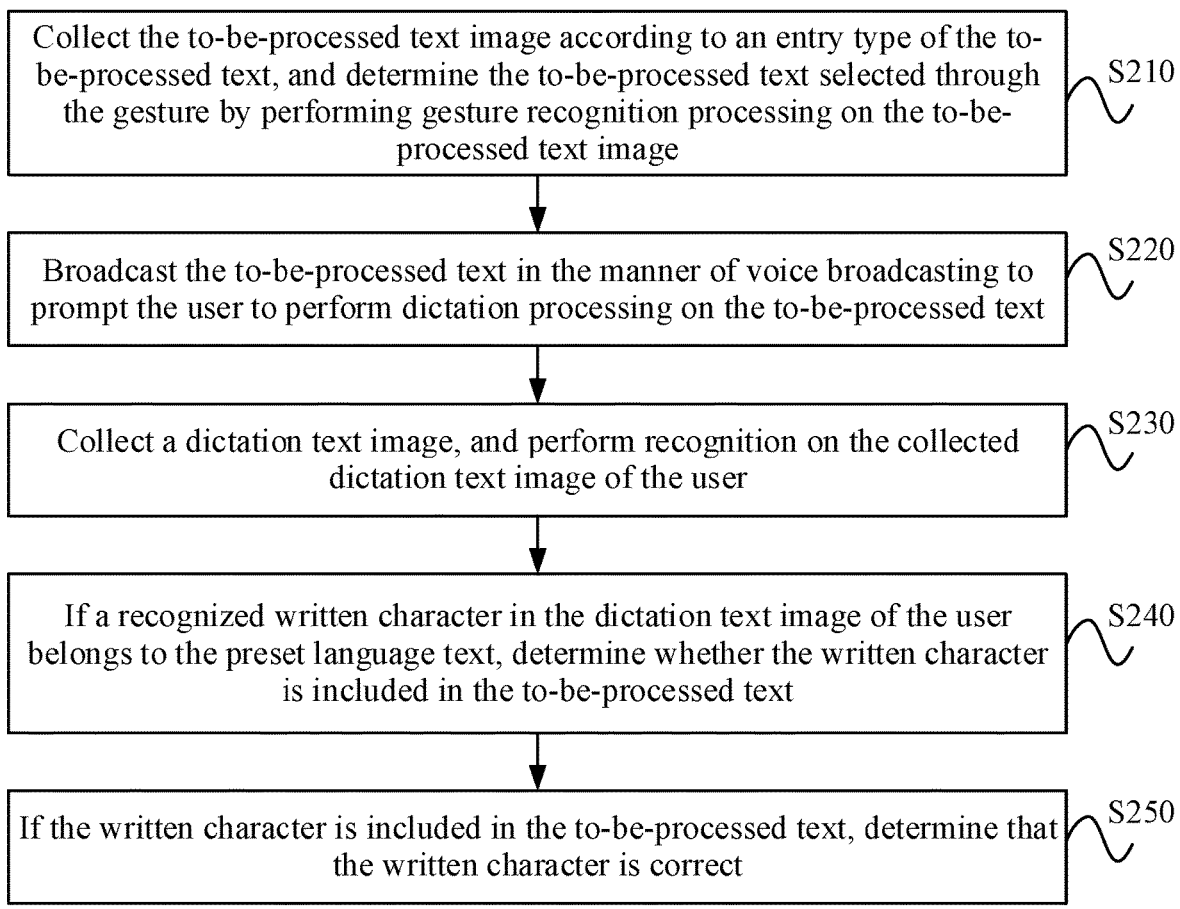
FIG. 2 is a flowchart of another text processing method according to an embodiment of the present disclosure.

FIG. 2 is a flowchart of another text processing method according to an embodiment of the present disclosure. The embodiment of the present disclosure is modified on the basis of the preceding embodiments, and the embodiment of the present disclosure may be combined with various optional schemes in one or more of the preceding embodiments. As shown in FIG. 2, the text processing method provided in the embodiment of the present disclosure includes the steps described below.

In step S210, a to-be-processed text image is collected according to an entry type of the to-be-processed text, and a to-be-processed text selected through a gesture is determined by performing gesture recognition processing on the to-be-processed text image.

In the embodiment, in an optional example, when the user independently selects the to-be-processed text to enter, the user may select and determine the to-be-processed text in a character-by-character and word-by-word entry manner. In another optional example, the user may also select and determine the to-be-processed text in a whole-paragraph entry manner. Exemplarily, if the user only needs to select and enter several words in a paper as the to-be-processed text for dictation, the manner of character-by-character and word-by-word entry may be adopted to select these words. If the user needs to select and enter a large number of words in multiple paragraphs as the to-be-processed text for dictation, the manner of whole-paragraph entry may be adopted to select the words in these paragraphs for entry. Therefore, the entry type of the to-be-processed text may be determined first, so that the to-be-processed text may be selected according to the manner matching the entry type of the to-be-processed text, and the to-be-processed text may be entered.

In an embodiment, the entry type of the to-be-processed text is selected by the user touching a type selection control on the electronic device. For example, the user, by touching, triggers a "word" entry control and a "paragraph" entry control on the electronic device, to achieve the selection of the entry type of the to-be-processed text. In an embodiment, the user may also select the entry type of the to-be-processed text in a voice control manner. For example, the user may send a voice instruction such as "I want to enter words" or a voice instruction such as "I want to enter paragraphs" to the electronic device, to achieve the selection of the entry type of the to-be-processed text. In an embodiment, the operation of determining the entry type of the to-be-processed text may be performed only at the first time of entry. The determined entry type is continuously used during the entry process and is finally cancelled for restoration after the entry is completed.

In an optional implementation of the embodiment, the step in which the to-be-processed text image is collected according to the entry type of the to-be-processed text, and the to-be-processed text selected through the gesture is determined by performing the gesture recognition on the to-be-processed text image may include the steps A1 to A2 described below.

In step A1, if the entry type of the to-be-processed text is character-by-character entry, a text image at a fingertip point of the user is collected as the to-be-processed text image.

In the implementation, if it is determined that the entry type of the to-be-processed text is character-by-character entry, it indicates that the user wants to select the to-be-processed text needing to be dictated in the manner of character-by-character entry, and at this time, the user is prompted to specify which words need to be used as the to-be-processed text for entry by a fingertip. Correspondingly, the electronic device may collect a real-time image at the position of the fingertip of the user as the to-be-processed text image. It can be seen that words at the position of the fingertip of the user in the to-be-processed text image may be used as the to-be-processed text for entry.

In an optional example, if it is determined that the entry type of the to-be-processed text is character-by-character entry, the electronic device may start a preset image collector to collect a real-time image at the fingertip point of the user as the to-be-processed text image. Exemplarily, when the user sends an instruction of "I want to enter words" to the electronic device, the electronic device may start the image collection function. If a finger appears in the image collection range and the fingertip points to a text, the image collector takes a picture of the region around the fingertip point, so that the text at the position of the fingertip can be subsequently entered.

In step A2, the text above the fingertip point of the user in the to-be-processed text image is used as the to-be-processed text.

In the implementation, the to-be-processed text image includes not only the fingertip point of the user, but also new words needing to be dictated which are selected by the user. At this time, the electronic device may perform gesture recognition on the to-be-processed text image, recognize the fingertip point of the user in the to-be-processed text image, and use the text at a preset position of the fingertip point of the user as the to-be-processed text. In an optional example, a character or a text above the fingertip is used as the to-be-processed text needing to be entered, that is, the fingertip of the user points below the new words needing to be dictated. After recognizing the fingertip of the user in the to-be-processed text image, the electronic device uses the recognized text above the fingertip of the user as the to-be-processed text for entry.

In the implementation, after the text above the fingertip of the user in the to-be-processed text image is determined, whether the text above the fingertip of the user is a preset language text may be determined. If the text above the fingertip of the user is the preset language text, optical character recognition (OCR) is performed on the text above the fingertip of the user to obtain corresponding text characters. Further, the text above the fingertip of the user after the OCR is performed is used as the to-be-processed text for entry. In addition, the user may continue to select other new words needing to be dictated by using the same operation as described above, and the electronic device may continue to recognize the to-be-processed text selected by the user for entry by using the same entry manner as described above.

According to the preceding optional implementation, it can be achieved that the user can select suitable words according to requirements of the user as the to-be-processed words for entry, and thus it can be ensured that the entered to-be-processed text is the text content that the user needs for dictation and reinforcement, rather than an arbitrary text content. Therefore, it is ensured that the user can perform purposeful dictation for reinforcement.

In another optional implementation of the embodiment, the step in which the to-be-processed text image is collected according to the entry type of the to-be-processed text, and the to-be-processed text selected through the gesture is determined by performing the gesture recognition on the to-be-processed text image may include the steps B1 to B2 described below.

In step B1, if the entry type of the to-be-processed text is overall entry, an image collector is started to collect an image when a text is selected through a gesture.

In the implementation, if it is determined that the entry type of the to-be-processed text is overall entry, it indicates that the user wants to select the to-be-processed text needing to be dictated in the manner of whole-paragraph entry, and at this time, the user is prompted to specify words in which paragraphs need to be used as the to-be-processed text for entry by circling with a finger. The electronic device starts the image collector to collect multiple frames of real-time images in which the finger delimits a whole paragraph or an overall range of characters in the paragraph region. Exemplarily, when the user sends a voice instruction of "I want to enter a whole paragraph" to the electronic device, the electronic device starts, in response to the voice instruction, the image collector to collect multiple frames of images or a video when the user delimits a whole paragraph or an overall range of characters in the paragraph region through a gesture.

In step B2, if it is detected that the image collected by the image collector includes a circling gesture of the user, a circling trace of the finger of the user is determined, and a text circled by the circling trace is used as the to-be-processed text.

In the implementation, the user delimits a whole paragraph or an overall range of characters in the paragraph region through a gesture in a circling manner. At this time, through the analysis of the multiple frames of images or the video collected by the image collector, the circling gesture of the user may be recognized, and then the circling trace of the finger of the user may be determined. The electronic device may use the text circled by the circling trace of the finger of the user as the to-be-processed text.

In an optional example, the electronic device may perform gesture recognition on multiple frames of images collected by the image collector, recognize the fingertip of the user included in the multiple frames of images, and determine the position of the fingertip of the user in each frame of image, to calculate the circling trace of the fingertip of the user. Exemplarily, the electronic device calls the image collector to consecutively collect multiple frames of real-time images when the user circles through a gesture at a collection frequency of 5 frames per second, determines the position where the fingertip of the user touches in each frame of image, and finally calculates the circling trace of the fingertip of the user. The text within the range of the circling trace may be regarded as the to-be-processed text.

In an implementation, after the text circled by the circling trace is determined, the electronic device may determine whether the text circled by the circling trace is the preset language text. If the text circled by the circling trace is the preset language text, the OCR is performed on the text circled by the circling trace to obtain corresponding text characters. Further, the text circled by the circling trace after the OCR is performed is used as the to-be-processed text for entry.

In an optional example, after the OCR is performed on the text circled by the circling trace, word segmentation processing may further be performed according to spaces and punctuation in the text circled by the circling trace, and text characters obtained after the word segmentation processing are used as the to-be-processed text for entry. In an embodiment, after the word segmentation processing, common words in the text characters obtained after the word segmentation processing are filtered out according to a preset common word library. For example, "的", "和", "他" and other preset common words are filtered out. In addition, the user may continue to select other new words needing to be dictated by using the same operation as described above, and the electronic device may continue to recognize the to-be-processed text selected by the user for entry by using the same entry manner as described above.

According to the above optional implementation, it can be achieved that the user can select the text of a whole paragraph as the to-be-processed text according to requirements of the user. For example, for a whole paragraph with most new words, the entry complexity for the user can be simplified by the above optional implementation, and it is ensured that the user can enter the to-be-processed text quickly. At the same time, it can be ensured that the entered to-be-processed text is a text content that the user needs for dictation and reinforcement, rather than an arbitrary text content. Therefore, it is ensured that the user can perform purposeful dictation for reinforcement.

In step S120, the to-be-processed text is broadcasted in the manner of voice broadcasting to prompt the user to perform dictation processing on the to-be-processed text.

In step S230, a dictation text image is collected, and recognition is performed on the collected dictation text image of the user.

In an embodiment, after the dictation text image of the user is collected, the dictation text image is entered into a preset OCR model, and characters handwritten by the user during the dictation and included in the dictation text image are output through the OCR model. In an embodiment, a large number of dictation text images including written characters may be used in advance as training sample data, and model training is performed based on a convolutional neural network (CNN) model to obtain the preset OCR model.

In step S240, if a recognized written character in the dictation text image of the user belongs to the preset language text, whether the written character is included in the to-be-processed text is determined.

In the embodiment, after the dictation text image is recognized and written characters of the user during the dictation are obtained, it may be determined that whether the recognized written characters are the preset language text. In an embodiment, if the recognized written characters belong to the preset language text, each written character is searched for in the to-be-processed text for matching according to the writing order and the broadcasting order. In an embodiment, if a written character can be found and matched in the to-be-processed text, it is determined that the written character is included in the to-be-processed text; if a written character cannot be found and matched in the to-be-processed text, it is determined that the written character of the user is not included in the to-be-processed text.

In step S250, if the written character is included in the to-be-processed text, it is determined that the written character is correct.

In the implementation, if it is determined that the recognized written character is included in the to-be-processed text, it is marked that the user wrote correctly for the written character; if it is determined that the recognized written character is not included in the to-be-processed text, it is marked that the user wrote wrong for the written character.

On the basis of the embodiments, in an embodiment, after a dictation check result is determined according to a recognition result and the to-be-processed text, the method further includes the following step: a screenshot of a wrong written character in the dictation text image is displayed on a screen to prompt the user to perform a reinforcement exercise. Exemplarily, the electronic device may display the screenshot of a written character marked as wrong on the screen. In addition, the electronic device may also calculate a dictation correct rate of the user according to the number of correct written characters. The correct rate may be calculated as the ratio of the number of written characters marked as correct to the total number of entered words included in the to-be-processed text.

The embodiment of the present disclosure provides a text processing scheme. When dictation of new words is required, an electronic device may collect, according to an entry type of the to-be-dictated to-be-processed text, a to-be-processed text image when a student selects a to-be-processed text, automatically recognize the to-be-processed text independently selected by the student from the to-be-processed text image, and at the same time, broadcast the to-be-processed text selected by the student in the manner of voice broadcasting. In this way, it can be ensured that the to-be-processed text is broadcasted in standard mandarin, and the time of the parent will not be occupied. In addition, after the dictation is completed, the automatic dictation check may further be performed on the dictation operation of the student according to the collected dictation text image of the user, so that the dictation result can be fed back to the students in time.

Figure 3:
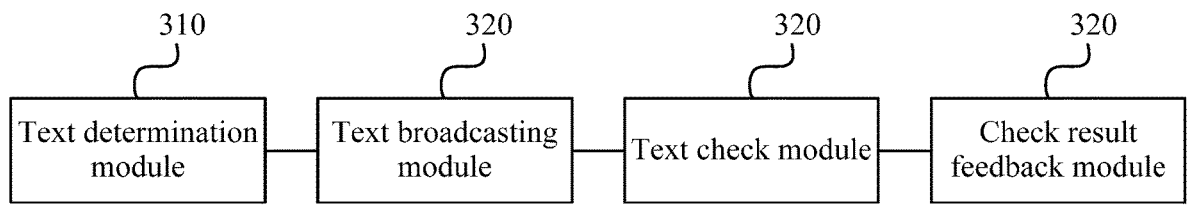
FIG. 3 is a block diagram of a text processing apparatus according to an embodiment of the present disclosure.

FIG. 3 is a block diagram of a text processing apparatus according to an embodiment of the present disclosure. The embodiment of the present disclosure is applicable to the case of assisting students in automatic dictation and automatic checking of new words. This apparatus may be implemented in software or hardware, and may be configured in an electronic device having network communication functions. As shown in FIG. 3, the text processing apparatus provided in the embodiment of the present disclosure includes a text determination module 310, a text broadcasting module 320 and a text check module 330.

The text determination module 310 is configured to collect a to-be-processed text image, and perform gesture recognition on the to-be-processed text image to obtain a to-be-processed text, where the to-be-processed text is a text selected from the to-be-processed text image through a gesture.

The text broadcasting module 320 is configured to broadcast the to-be-processed text in the manner of voice broadcasting to prompt performing dictation processing on the to-be-processed text.

The text check module 330 is configured to collect a dictation text image, perform recognition on the dictation text image, and determine a dictation check result according to a recognition result and the to-be-processed text.

On the basis of the preceding embodiments, in an embodiment, the text determination module 310 is configured to collect the to-be-processed text image according to an entry type of the to-be-processed text, and determine the to-be-processed text selected through the gesture by performing gesture recognition processing on the to-be-processed text image.

On the basis of the preceding embodiments, in an embodiment, the text determination module 310 includes a first text image collection unit and a first text content determination unit.

The first text image collection unit is configured to if the entry type of the to-be-processed text is character-by-character entry, collect a text image at a fingertip point of the user as the to-be-processed text image.

The first text content determination unit is configured to use a text above the fingertip point of the user in the to-be-processed text image as the to-be-processed text.

On the basis of the preceding embodiments, in an embodiment, the text determination module 310 includes a second text image collection unit and a second text content determination unit.

The second text image collection unit is configured to if the entry type of the to-be-processed text is overall entry, start an image collector to collect an image.

The second text content determination unit is configured to if it is detected that the image collected by the image collector includes a circling gesture of the user, determine a circling trace of a finger of the user, and use a text circled by the circling trace as the to-be-processed text.

On the basis of the preceding embodiments, in an embodiment, the text check module 330 is configured to if a recognized written character in the dictation text image of the user belongs to a preset language text, determine whether the written character is included in the to-be-processed text; and if the written character is included in the to-be-processed text, determine that the written character is correct.

Based on the preceding embodiments, in an embodiment, the apparatus further includes a check result feedback module 340.

The check result feedback module 340 is configured to display a screenshot of a wrong written character in the dictation text image on a screen to prompt the user to perform a reinforcement exercise.

The text processing apparatus provided in the embodiment of the present disclosure may execute the text processing method provided in any one of the preceding embodiments of the present disclosure, and has corresponding functions for and beneficial effects of executing the text processing method. For the technical details not described in detail in the preceding embodiments, reference may be made to the text processing method provided in any one of the embodiments of the present disclosure.

Figure 4:
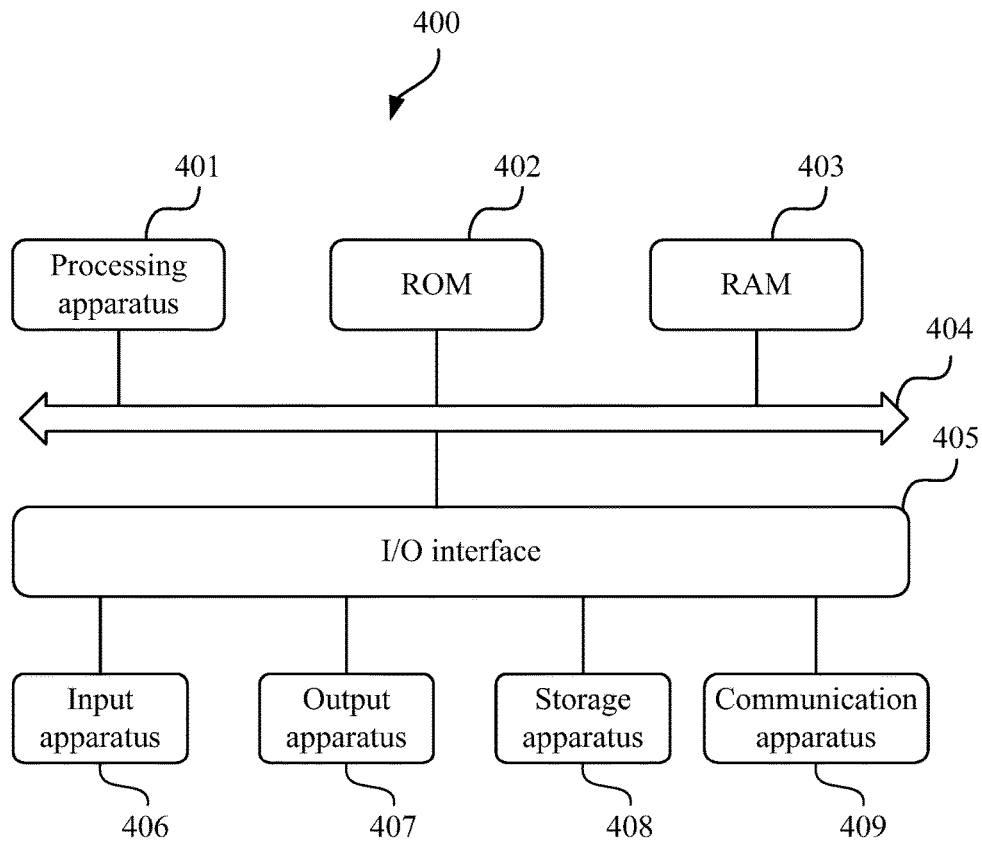
FIG. 4 is a structural diagram of an electronic device according to an embodiment of the present disclosure.

FIG. 4 is a structural diagram of an electronic device according to an embodiment of the present disclosure. Referring to FIG. 4, FIG. 4 shows a structural diagram of an electronic device 400 suitable for implementing the embodiments of the present disclosure. The electronic device 400 in the embodiments of the present disclosure may include, but is not limited to, a mobile terminal such as a mobile phone, a laptop, a digital broadcast receiver, a personal digital assistant (PDA), a PAD, a portable media player (PMP) and a vehicle-mounted terminal (such as a vehicle-mounted navigation terminal) and a fixed terminal such as a digital television (TV) and a desktop computer. The electronic device shown in FIG. 4 is only an example.

As shown in FIG. 4, the electronic device 400 may include a processing apparatus 401 (such as a central processing unit and a graphics processing unit). The processing apparatus 401 may perform various types of appropriate operations and processing based on a program stored in a read-only memory (ROM) 402 or a program loaded from a storage apparatus 406 to a random-access memory (RAM) 403. Various programs and data required for the operation of the electronic device 400 are also stored in the RAM 403. The processing apparatus 401, the ROM 402 and the RAM 403 are connected to each other through a bus 404. An input/output (I/O) interface 405 is also connected to the bus 404.

Generally, the following apparatuses may be connected to the I/O interface 405: an input apparatus 406 such as a touch screen, a touch pad, a keyboard, a mouse, a camera, a microphone, an accelerometer and a gyroscope; an output apparatus 407 such as a liquid crystal display (LCD), a speaker and a vibrator; the storage apparatus 406 such as a magnetic tape and a hard disk; and a communication apparatus 409. The communication apparatus 409 may allow the electronic device 400 to perform wireless or wired communication with other devices to exchange data. Although FIG. 4 shows the electronic device 400 having various apparatuses, it is to be understood that it is not required to implement or have all the shown apparatuses. Alternatively, more or fewer apparatuses may be implemented or present.

According to the embodiment of the present disclosure, the process described above with reference to the flowchart may be implemented as a computer software program. For example, the embodiment of the present disclosure includes a computer program product. The computer program product includes a computer program carried in a non-transitory computer-readable medium. The computer program includes program codes for performing the method shown in the flowchart. In such an embodiment, the computer program may be downloaded and installed from the network through the communication apparatus 409, or may be installed from the storage apparatus 406, or may be installed from the ROM 402. When the computer program is executed by the processing apparatus 401, the preceding functions in the text processing method of the embodiments of the present disclosure are executed.

It is to be noted that the preceding computer-readable medium in the present disclosure may be a computer-readable signal medium or a computer-readable storage medium or any combination thereof. The computer-readable storage medium may be an electronic, magnetic, optical, electromagnetic, infrared or semiconductor system, apparatus or device, or any combination thereof. Examples of the computer-readable storage medium may include an electrical connection with one or more wires, a portable computer magnetic disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or in conjunction with an instruction execution system, apparatus or device. In the present disclosure, the computer-readable signal medium may include a data signal propagated on a baseband or as a part of a carrier, and computer-readable program codes are carried in the data signal. This propagated data signal may take multiple forms including an electromagnetic signal, an optical signal or any suitable combination thereof. The computer-readable signal medium may further be any computer-readable medium other than the computer-readable storage medium. The computer-readable signal medium may send, propagate or transmit a program used by or in conjunction with an instruction execution system, apparatus or device. The program codes included on the computer-readable medium may be transmitted via any appropriate medium which includes a wire, an optical cable, a radio frequency (RF) or any appropriate combination thereof.

In some implementations, clients and servers may communicate using any currently known or future developed network protocol, such as the HyperText Transfer Protocol (HTTP), and may be interconnected with any form or medium of digital data communication (such as a communication network). Examples of the communication network include a local area network (LAN), a wide area network (WAN), an internet (such as the Internet) and a peer-to-peer network (such as an ad hoc network), as well as any currently known or future developed network.

The preceding computer-readable medium may be included in the electronic device or may exist alone without being assembled into the electronic device.

The preceding computer-readable medium carries one or more programs. When the one or more programs are executed by the electronic device, the electronic device collects a to-be-processed text image, and performs gesture recognition on the to-be-processed text image to obtain a to-be-processed text, where the to-be-processed text is a text selected from the to-be-processed text image through a gesture; broadcasts the to-be-processed text in the manner of voice broadcasting to prompt performing dictation processing on the to-be-processed text; and collects a dictation text image, performs recognition on the dictation text image, and determines a dictation check result according to a recognition result and the to-be-processed text.

Computer program codes for performing the operations of the present disclosure may be written in one or more programming languages or combination thereof, including object-oriented programming languages such as Java, Smalltalk, C++, as well as conventional procedural programming languages such as "C" or similar programming languages. The program codes may be executed entirely on a user computer, partly on a user computer, as a stand-alone software package partly on a user computer and partly on a remote computer, or entirely on a remote computer or a server. In the case relating to the remote computer, the remote computer may be connected to the user computer via any type of network including a LAN or a WAN, or may be connected to an external computer (for example, via the Internet through an Internet service provider).

The flowcharts and block diagrams in the drawings show the possible architecture, function and operation of the system, method and computer program product according to various embodiments of the present disclosure. In this regard, each block in a flowchart or block diagram may represent a module, a program segment or part of codes that contains one or more executable instructions for implementing specified logical functions. It is also to be noted that in some alternative implementations, the functions marked in the blocks may occur in an order different from those marked in the drawings. For example, two successive blocks may in fact be executed substantially in parallel or in a reverse order, which depends on the functions involved. It is also to be noted that each block of the block diagrams and/or flowcharts, and combinations of blocks in the block diagrams and/or flowcharts may be implemented by not only a specific-purpose hardware-based system that performs a specified function or operation, but also a combination of specific-purpose hardware and computer instructions.

The units involved in the embodiments of the present disclosure may be implemented by software or hardware. The name of a unit does not constitute a limitation on the unit itself under certain circumstances. For example, the text broadcasting module may also be described as "a module broadcasting the to-be-processed text in the manner of voice broadcasting to prompt performing dictation processing on the to-be-processed text".

The functions described above herein may be performed, at least partially, by one or more hardware logic components. For example, and without limitations, example types of hardware logic components that may be used include: a field-programmable gate array (FPGA), an application-specific integrated circuit (ASIC), an application-specific standard product (ASSP), a system on a chip (SOC), a complex programmable logic device (CPLD) and the like.

In the context of the present disclosure, a machine-readable medium may be a tangible medium that may include or store a program that is used by or in conjunction with an instruction execution system, apparatus or device. The machine-readable medium may be a machine-readable signal medium or a machine-readable storage medium. The machine-readable medium may include an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

According to one or more embodiments of the present disclosure, example 1 provides a text processing method. The method includes steps described below.

A to-be-processed text image is collected, and gesture recognition is performed on the to-be-processed text image to obtain a to-be-processed text, where the to-be-processed text is a text selected from the to-be-processed text image through a gesture.

The to-be-processed text is broadcasted in the manner of voice broadcasting to prompt performing dictation processing on the to-be-processed text.

A dictation text image is collected, recognition is performed on the dictation text image, and a dictation check result is determined according to a recognition result and the to-be-processed text.

According to one or more embodiments of the present disclosure, example 2 provides a text processing method, where the step in which the to-be-processed text image is collected, and the gesture recognition is performed on the to-be-processed text image to obtain the to-be-processed text includes the steps described below.

The to-be-processed text image is collected according to an entry type of the to-be-processed text, and the to-be-processed text selected through the gesture is determined by performing gesture recognition processing on the to-be-processed text image.

According to one or more embodiments of the present disclosure, example 3 provides a text processing method, where the step in which the to-be-processed text image is collected according to the entry type of the to-be-processed text, and the to-be-processed text selected through the gesture is determined by performing the gesture recognition on the to-be-processed text image includes the steps described below.

If the entry type of the to-be-processed text is character-by-character entry, a text image at a fingertip point of a user is collected as the to-be-processed text image.

A text above the fingertip point of the user in the to-be-processed text image is used as the to-be-processed text.

According to one or more embodiments of the present disclosure, example 4 provides a text processing method, where the step in which the to-be-processed text image is collected according to the entry type of the to-be-processed text, and the to-be-processed text selected through the gesture is determined by performing the gesture recognition on the to-be-processed text image includes the steps described below.

If the entry type of the to-be-processed text is overall entry, an image collector is started to collect an image.

If it is detected that the image collected by the image collector includes a circling gesture of the user, a circling trace of the finger of the user is determined, and a text circled by the circling trace is used as the to-be-processed text.

According to one or more embodiments of the present disclosure, example 5 provides a text processing method, where the step in which the dictation check result is determined according to the recognition result and the to-be-processed text includes the steps described below.

If a recognized written character in the dictation text image of the user belongs to a preset language text, whether the written character is included in the to-be-processed text is determined.

If the written character is included in the to-be-processed text, it is determined that the written character is correct.

According to one or more embodiments of the present disclosure, example 6 provides a text processing method, where after the step in which the dictation check result is determined according to the recognition result and the to-be-processed text, the step described below is further included.

A screenshot of a wrong written character in the dictation text image is displayed on a screen to prompt the user to perform a reinforcement exercise.

According to one or more embodiments of the present disclosure, example 7 provides a text processing apparatus. The apparatus includes a text determination module, a text broadcasting module and a text check module.

The text determination module is configured to collect a to-be-processed text image, and perform gesture recognition on the to-be-processed text image to obtain a to-be-processed text, where the to-be-processed text is a text selected from the to-be-processed text image through a gesture.

The text broadcasting module is configured to broadcast the to-be-processed text in the manner of voice broadcasting to prompt performing dictation processing on the to-be-processed text.

The text check module is configured to collect a dictation text image, perform recognition on the dictation text image, and determine a dictation check result according to a recognition result and the to-be-processed text.

According to one or more embodiments of the present disclosure, example 8 provides a text processing apparatus, where the text determination module is configured to collect the to-be-processed text image according to an entry type of the to-be-processed text, and determine the to-be-processed text selected through the gesture by performing gesture recognition processing on the to-be-processed text image.

According to one or more embodiments of the present disclosure, example 9 provides a text processing apparatus, where the text determination module includes a first text image collection unit and a first text content determination unit.

The first text image collection unit is configured to if the entry type of the to-be-processed text is character-by-character entry, collect a text image at a fingertip point of a user as the to-be-processed text image.

The first text content determination unit is configured to use a text above the fingertip point of the user in the to-be-processed text image as the to-be-processed text.

According to one or more embodiments of the present disclosure, example 10 provides a text processing apparatus, where the text determination module includes a second text image collection unit and a second text content determination unit.

The second text image collection unit is configured to if the entry type of the to-be-processed text is overall entry, start an image collector to collect an image.

The second text content determination unit is configured to if it is detected that the image collected by the image collector includes a circling gesture of the user, determine a circling trace of a finger of the user, and use a text circled by the circling trace as the to-be-processed text.

According to one or more embodiments of the present disclosure, example 11 provides a text processing apparatus, where the text check module is configured to if a recognized written character in the dictation text image of the user belongs to a preset language text, whether the written character is included in the to-be-processed text is determined.

If the written character is included in the to-be-processed text, it is determined that the written character is correct.

According to one or more embodiments of the present disclosure, example 12 provides a text processing apparatus. The apparatus further includes a check result feedback module.

The check result feedback module is configured to display a screenshot of a wrong written character in the dictation text image on a screen to prompt the user to perform a reinforcement exercise.

According to one or more embodiments of the present disclosure, example 13 provides an electronic device. The electronic device includes one or more processing apparatuses and a storage apparatus configured to store one or more programs.

The one or more programs, when executed by the one or more processing apparatuses, cause the one or more processing apparatuses to implement the text processing method of any one of example 1 to example 6.

According to one or more embodiments of the present disclosure, example 14 provides a computer-readable medium configured to store a computer program. The computer program, when executed by a processing apparatus, implements the text processing method of any one of example 1 to example 6.

The preceding description is merely illustrative of preferred embodiments of the present disclosure and the technical principles used therein. Those of ordinary skill in the art should understand that the scope referred to in the disclosure is not limited to the technical solutions formed by the particular combination of the preceding technical features, but intended to cover other technical solutions which may be formed by any combination of the preceding technical features or their equivalents without departing from the concept of the disclosure, for example, technical solutions formed by mutual substitutions of the preceding feature and the technical features disclosed in the present disclosure (but not limited to) that have similar functions.

Although the operations are depicted in a particular order, this should not be construed as requiring that such operations should be performed in the particular order shown or in a sequential order. In certain circumstances, multitasking and parallel processing may be advantageous. Similarly, although implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually or in any suitable sub-combination.

Although the subject matter is described in the language specific to structural features and/or methodological logic acts, it is to be understood that the subject matter defined in the appended claims is not necessarily limited to the specific features or acts described above. Conversely, the specific features and acts described above are merely example forms of implementing the claims.

What is claimed is:

1. A text processing method, comprising:
    collecting a to-be-processed text image, and performing gesture recognition on the to-be-processed text image to obtain a to-be-processed text, wherein the to-be-processed text is a text selected from the to-be-processed text image through a gesture;
    performing voice broadcasting on the to-be-processed text to prompt a user to perform dictation processing on the to-be-processed text; and
    collecting a dictation text image, performing recognition on the dictation text image, and determining a dictation check result according to a recognition result and the to-be-processed text,
    wherein collecting the to-be-processed text image, and performing the gesture recognition on the to-be-processed text image to obtain the to-be-processed text comprises:
    collecting, according to an entry type of the to-be-processed text, the to-be-processed text image, and determining, by performing the gesture recognition on the to-be-processed text image, the to-be-processed text selected through the gesture;
    wherein collecting, according to the entry type of the to-be-processed text, the to-be-processed text image, and determining, by performing the gesture recognition on the to-be-processed text image, the to-be-processed text selected through the gesture comprises:
        based on a determination result that the entry type of the to-be-processed text is character-by-character entry, collecting a text image at a fingertip point of the user as the to-be-processed text image; and
        using a text above the fingertip point of the user in the to-be-processed text image as the to-be-processed text.

2. The method according to claim 1, wherein collecting, according to the entry type of the to-be-processed text, the to-be-processed text image, and determining, by performing the gesture recognition on the to-be-processed text image, the to-be-processed text selected through the gesture comprises:
    based on a determination result that the entry type of the to-be-processed text is overall entry, starting an image collector to collect an image; and based on a determination result of detecting that the image collected by the image collector comprises a circling gesture of the user, determining a circling trace of a finger of the user, and using a text circled by the circling trace as the to-be-processed text.

3. The method according to claim 1, wherein determining the dictation check result according to the recognition result and the to-be-processed text comprises:
based on a determination result that a recognized written character in the dictation text image of the user belongs to a preset language text, determining whether the written character is comprised in the to-be-processed text; and
based on a determination result that the written character is comprised in the to-be-processed text, determining that the written character is correct.

4. The method according to claim 1, after determining the dictation check result according to the recognition result and the to-be-processed text, further comprising:
displaying a screenshot of a wrong written character in the dictation text image on a screen to prompt the user to perform a reinforcement exercise.

5. An electronic device, comprising:
one or more processing apparatuses; and
a memory apparatus, which is configured to store one or more programs;
wherein the one or more programs, when executed by the one or more processing apparatuses, cause the one or more processing apparatuses to perform:
collecting a to-be-processed text image, and performing gesture recognition on the to-be-processed text image to obtain a to-be-processed text, wherein the to-be-processed text is a text selected from the to-be-processed text image through a gesture;
performing voice broadcasting on the to-be-processed text to prompt a user to perform dictation processing on the to-be-processed text; and
collecting a dictation text image, performing recognition on the dictation text image, and determining a dictation check result according to a recognition result and the to-be-processed text
wherein collecting the to-be-processed text image, and performing the gesture recognition on the to-be-processed text image to obtain the to-be-processed text comprises:
collecting, according to an entry type of the to-be-processed text, the to-be-processed text image, and determining, by performing the gesture recognition on the to-be-processed text image, the to-be-processed text selected through the gesture;
wherein collecting, according to the entry type of the to-be-processed text, the to-be-processed text image, and determining, by performing the gesture recognition on the to-be-processed text image, the to-be-processed text selected through the gesture comprises:
based on a determination result that the entry type of the to-be-processed text is character-by-character entry, collecting a text image at a fingertip point of the user as the to-be processed text image; and
using a text above the fingertip point of the user in the to-be-processed text image as the to-be-processed text.

6. The electronic device of claim 5, wherein collecting, according to the entry type of the to-be-processed text, the to-be-processed text image, and determining, by performing the gesture recognition on the to-be-processed text image, the to-be-processed text selected through the gesture comprises:
based on a determination result that the entry type of the to-be-processed text is overall entry, starting an image collector to collect an image; and
based on a determination result of detecting that the image collected by the image collector comprises a circling gesture of the user, determining a circling trace of a finger of the user, and using a text circled by the circling trace as the to-be-processed text.

7. The electronic device of claim 5, wherein determining the dictation check result according to the recognition result and the to-be-processed text comprises:
based on a determination result that a recognized written character in the dictation text image of the user belongs to a preset language text, determining whether the written character is comprised in the to-be-processed text; and
based on a determination result that the written character is comprised in the to-be-processed text, determining that the written character is correct.

8. The electronic device of claim 5, after determining the dictation check result according to the recognition result and the to-be-processed text, further performing:
displaying a screenshot of a wrong written character in the dictation text image on a screen to prompt the user to perform a reinforcement exercise.

9. A non-transitory computer-readable medium, which is configured to store a computer program which, when executed by a processing apparatus, performs:
collecting a to-be-processed text image, and performing gesture recognition on the to-be-processed text image to obtain a to-be-processed text, wherein the to-be-processed text is a text selected from the to-be-processed text image through a gesture;
performing voice broadcasting on the to-be-processed text to prompt a user to perform dictation processing on the to-be-processed text; and
collecting a dictation text image, performing recognition on the dictation text image, and determining a dictation check result according to a recognition result and the to-be-processed text,
wherein collecting the to-be-processed text image, and performing the gesture recognition on the to-be-processed text image to obtain the to-be-processed text comprises:
collecting, according to an entry type of the to-be-processed text, the to-be-processed text image, and determining, by performing the gesture recognition on the to-be-processed text image, the to-be-processed text selected through the gesture;
wherein collecting, according to the entry type of the to-be-processed text, the to-be-processed text image, and determining, by performing the gesture recognition on the to-be-processed text image, the to-be-processed text selected through the gesture comprises:
based on a determination result that the entry type of the to-be-processed text is character-by-character entry, collecting a text image at a fingertip point of the user as the to-be processed text image; and
using a text above the fingertip point of the user in the to-be-processed text image as the to-be-processed text.

10. The non-transitory computer-readable medium of claim 9, wherein collecting, according to the entry type of the to-be-processed text, the to-be-processed text image, and determining, by performing the gesture recognition on the to-be-processed text image, the to-be-processed text selected through the gesture comprises:
- based on a determination result that the entry type of the to-be-processed text is overall entry, starting an image collector to collect an image; and
- based on a determination result of detecting that the image collected by the image collector comprises a circling gesture of the user, determining a circling trace of a finger of the user, and using a text circled by the circling trace as the to-be-processed text.

11. The non-transitory computer-readable medium of claim 9, wherein determining the dictation check result according to the recognition result and the to-be-processed text comprises:
- based on a determination result that a recognized written character in the dictation text image of the user belongs to a preset language text, determining whether the written character is comprised in the to-be-processed text; and
- based on a determination result that the written character is comprised in the to-be-processed text, determining that the written character is correct.

12. The non-transitory computer-readable medium of claim 9, after determining the dictation check result according to the recognition result and the to-be-processed text, further performing:
- displaying a screenshot of a wrong written character in the dictation text image on a screen to prompt the user to perform a reinforcement exercise.

* * * * *